United States Patent
Paek (10) Patent No.: US 10,554,125 B1
(45) Date of Patent: Feb. 4, 2020

(54) NEGATIVE VOLTAGE CIRCUIT BASED ON DUAL CHARGE PUMP

(71) Applicant: Samsung Electro-Mechanics Co., Ltd., Suwon-si (KR)

(72) Inventor: Hyun Paek, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/431,797

(22) Filed: Jun. 5, 2019

(30) Foreign Application Priority Data

Mar. 7, 2019 (KR) .................. 10-2019-0026175

(51) Int. Cl.
*H02M 3/07* (2006.01)

(52) U.S. Cl.
CPC ........ *H02M 3/07* (2013.01); *H02M 2003/071* (2013.01); *H02M 2003/072* (2013.01)

(58) Field of Classification Search
CPC ......... G11C 5/145; H02M 3/07; H02M 3/073; H02M 2003/072; H02M 2003/075; H02M 2003/076; H02M 2003/077; H02M 2003/078
USPC ........................................ 327/536
See application file for complete search history.

(56) References Cited

U.S. PATENT DOCUMENTS

| 9,444,329 | B2* | 9/2016 | Arno ............... H02M 3/07 |
| 2003/0057469 | A1 | 3/2003 | Karaki | |
| 2011/0274295 | A1* | 11/2011 | Motoki ............ H02M 3/07 381/120 |
| 2012/0126778 | A1* | 5/2012 | Chevalier ......... H02M 3/07 323/311 |
| 2016/0020693 | A1* | 1/2016 | Ribarich .......... H02M 3/156 363/60 |

FOREIGN PATENT DOCUMENTS

| JP | 2003-45193 A | 2/2003 |
| JP | 2013-501496 A | 1/2013 |

* cited by examiner

*Primary Examiner* — John W Poos
(74) *Attorney, Agent, or Firm* — NSIP Law (57) ABSTRACT

A negative voltage circuit includes a dual charging circuit, a pumping capacitor circuit, a dual discharging circuit, an output switch circuit, and a load capacitor circuit. The dual charging circuit is configured to operate in a start-up or normal operating mode during a charging mode, and supply a first current in the start-up mode higher than a second current in the normal operating mode. The pumping capacitor circuit is configured to charge based on a charging current from the dual charging circuit. The dual discharging circuit is configured to operate in the start-up mode or the normal operating mode during a discharging mode, and discharge the pumping capacitor to allow a third current in the start-up mode to flow between the pumping capacitor and the terminal of the second operating voltage. The third current in the start-up mode is higher than a fourth current in the normal operating mode.

16 Claims, 8 Drawing Sheets

NEGATIVE VOLTAGE CIRCUIT BASED ON DUAL CHARGE PUMP

CROSS-REFERENCE TO RELATED APPLICATION

This application claims the benefit under 35 USC 119(a) of Korean Patent Application No. 10-2019-0026175 filed on Mar. 7, 2019, in the Korean Intellectual Property Office, the entire disclosure of which is incorporated herein by reference for all purposes.

BACKGROUND

1. Field

The following disclosure relates to a negative voltage circuit based on a dual charge pump.

2. Description of Related Art

In general, a radio-frequency (RF) switch device requires a negative voltage to improve isolation characteristics, which may be generated by a negative voltage circuit. As an example, the negative voltage circuit may use a negative charge pump.

A negative voltage charge pump may typically include an inverter and a charging capacitor. In the negative voltage charge pump, the time required to reach a target voltage and the magnitude of a loading current may be determined by a size of the inverter and a size of the charging capacitor.

As an example, the larger the size of the inverter, the more current that may be allowed to flow. The higher the capacitance of the charging capacitor, the more charge that may be controlled. For these reasons, a target voltage may be reached more rapidly, and high currents may be loaded by enlarging the capacitance of the charging capacitor and the size of the inverter.

In the typical negative voltage charge pump, more current loading is required when the charge pump first operates and when input power is high; otherwise, more current loading is not required.

However, when the negative voltage charge pump is typically set to appropriate more current loading in the early stage, a considerable amount of power may be consumed during the operation of the charge pump. When the negative voltage charge pump is set to appropriate less current loading during normal operation, initial loading time may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a negative voltage circuit includes a dual charging circuit, a pumping capacitor circuit, a dual discharging circuit, an output switch circuit, and a load capacitor circuit. The dual charging circuit, connected between a terminal of a first power supply voltage and a middle node, is configured to operate in a start-up mode or a normal operating mode during a charging mode, and supply a first current in the start-up mode higher than a second current in the normal operating mode. The pumping capacitor circuit, connected between the middle node and a first capacitor node, is configured to charge based on a charging current from the dual charging circuit. The dual discharging circuit, connected between the middle node and a terminal of a second operating mode, is configured to operate in the start-up mode or the normal operating mode during a discharging mode, and discharge the pumping capacitor to allow a third current in the start-up mode to flow between the pumping capacitor and the terminal of the second operating voltage, wherein the third current in the start-up mode is higher than a fourth current in the normal operating mode. The output switch circuit connects the first capacitor node to one of a terminal of the second operating voltage and an output terminal of a negative voltage circuit. The load capacitor circuit is connected between the output terminal and a ground to stabilize a negative voltage at the output terminal.

The dual charging circuit may include a first charging switch and a second charging switch. The first charging switch, connected between the terminal of the first power supply voltage and the middle node, may be configured to be in an ON state in a charging operation during the start-up mode to supply the first current. The second charging switch, connected to the first charging switch in parallel, may be configured to be in an ON state in a charging operation during the normal operating mode to supply the second current less than the first current.

The pumping capacitor circuit may include a capacitor connected between the middle node and the first capacitor node.

The dual discharging circuit may include a first discharging switch, connected between the middle node and a terminal of a second power supply voltage, and may be configured to be in an ON state in a discharging operation during the normal operating mode to supply the fourth current less than the third current.

The output switch circuit may include a ground switch and an output switch. The ground switch, connected to the first capacitor node and the terminal of the second operating voltage, may be configured to be in an ON state during the charging operation. The output switch, connected between the first capacitor node and the output terminal, may be configured to be in ON state during the discharging operation.

The load capacitor circuit may be connected between the output terminal and a ground to stabilize the negative voltage at the output terminal.

In another general aspect, a negative voltage circuit includes a dual charging circuit, a dual discharging circuit, an output switch circuit, a load capacitor circuit, and a control circuit. The dual charging circuit, connected between a terminal of a first power supply voltage and a middle node, is configured to operate in a start-up mode or a normal operating mode during a charging mode, and supply a first current in the start-up mode higher than a second current in the normal operating mode. The pumping capacitor circuit, connected between the middle node and a first capacitor node, is configured to charge based on a charging current from the dual charging circuit. The dual discharging circuit, connected between the middle node and a terminal of a second operating mode, is configured to operate in the start-up mode or the normal operating mode during a discharging mode, and discharge the pumping capacitor to allow a third current in the start-up mode to flow between the pumping capacitor and the terminal of the second operating voltage, wherein the third current in the start-up mode is higher than a fourth current in the normal operating mode.

The output switch circuit connects the first capacitor node to one of a terminal of the second operating voltage and an output terminal of a negative voltage circuit. The load capacitor circuit is connected between the output terminal and a ground to stabilize a negative voltage at the output terminal. The control circuit is configured to control the start-up mode upon an operation being started, the normal operating mode subsequent to the start-up mode, and the charging mode and the discharging mode in the start-up mode and the normal operating mode, respectively.

The control circuit may include a PWM generation circuit, a mode select circuit, a first driving signal generation circuit, and a second driving signal generation circuit. The PWM generation circuit may be configured to generate a PWM signal. The mode select circuit may be configured to control the start-up mode based on the negative voltage upon the operation being started and generate the operating mode control signal for controlling the normal operation mode subsequent to the start-up mode. The first driving signal generation circuit may be configured to generate first and second driving signals for controlling a charging of the dual charging circuit and a discharging of the dual discharging circuit based on the PWM signal and the operating mode control signal during the start-up mode. The second driving signal generation circuit may be configured to generate third and fourth driving signals for controlling a charging of the dual charging circuit and a discharging of the dual discharging circuit based on the PWM signal and the operation mode control signal during the normal operating mode.

The mode select circuit may include a comparison circuit configured to transition from a low level to a high level upon the negative voltage being higher than or equal to a first reference voltage, and transition from a high level to a low level upon the negative voltage being less than or equal to the second reference voltage.

The dual charging circuit may include a first charging switch and a second charging switch. The first charging switch, connected between the terminal of the first power supply voltage and the middle node, may be configured to be in an ON state in a charging operation during the start-up mode to supply the first current. The second charging switch, connected to the first charging switch in parallel, may be configured to be in an ON state in a charging operation during the normal operating mode to supply a second current less than the second current.

The pump capacitor circuit may include a capacitor connected between the middle node and the first capacitor node.

The dual discharging circuit may include a first discharging switch and a second discharging circuit. The first discharging switch, connected between the middle node and a terminal of a second power supply voltage, may be configured to be in an ON state in a discharging operation during the start-up mode to supply the third current. The second discharging circuit, connected to the first discharging switch in parallel, may be configured to be in an ON state in a discharging operation during the normal operating mode to supply the fourth current less than the third current.

The first driving signal generation circuit may control operations of the first charging switch and the first discharging switch using the first and second driving signals, respectively.

The second driving signal generation circuit may control operations of the second charging switch and the second discharging switch using the third and fourth driving signals, respectively.

The output switch circuit may include a ground switch and an output switch. The ground switch, connected between the first capacitor node and the terminal of the second operating voltage, may be configured to be in an ON state during the charging operation. The output switch, connected between the first capacitor node and the output terminal, may be configured to be in an ON state during the discharging operation.

The load capacitor circuit may include a load capacitor connected between the output terminal and a ground to stabilize the negative voltage at the output terminal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
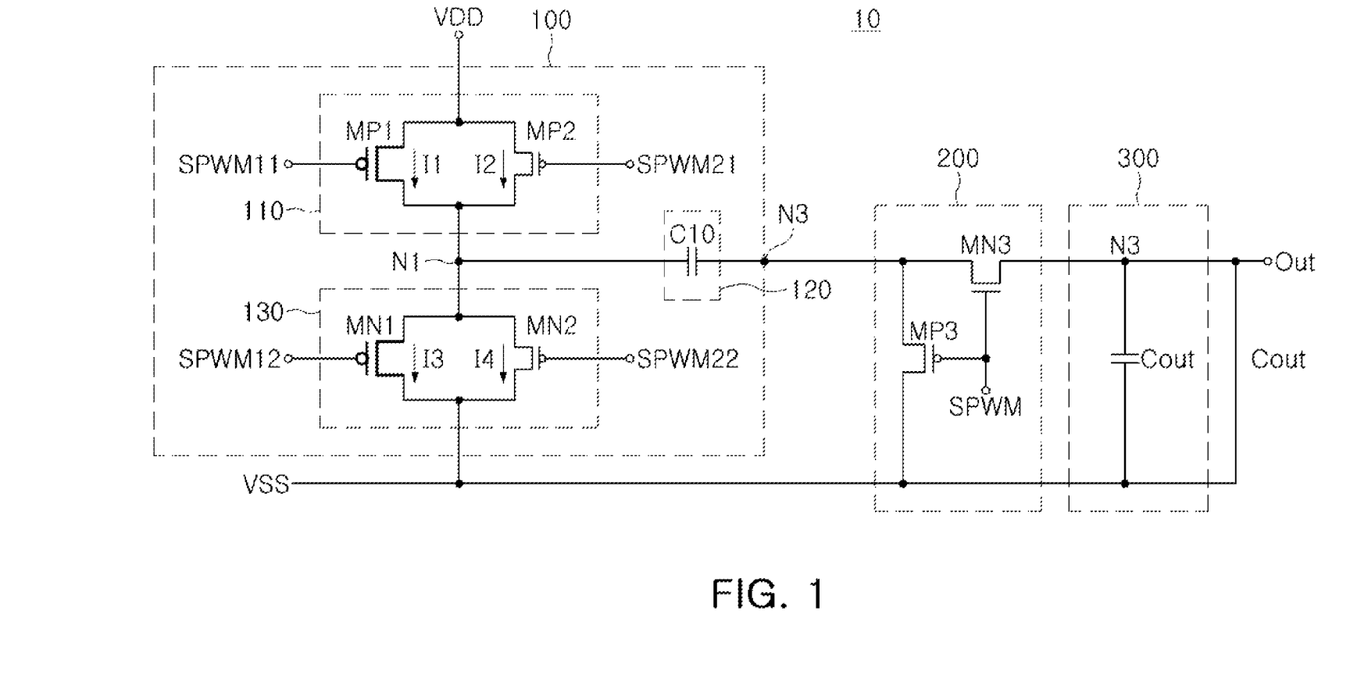
FIG. 1 illustrates an example of a negative voltage circuit.
Figure 2:
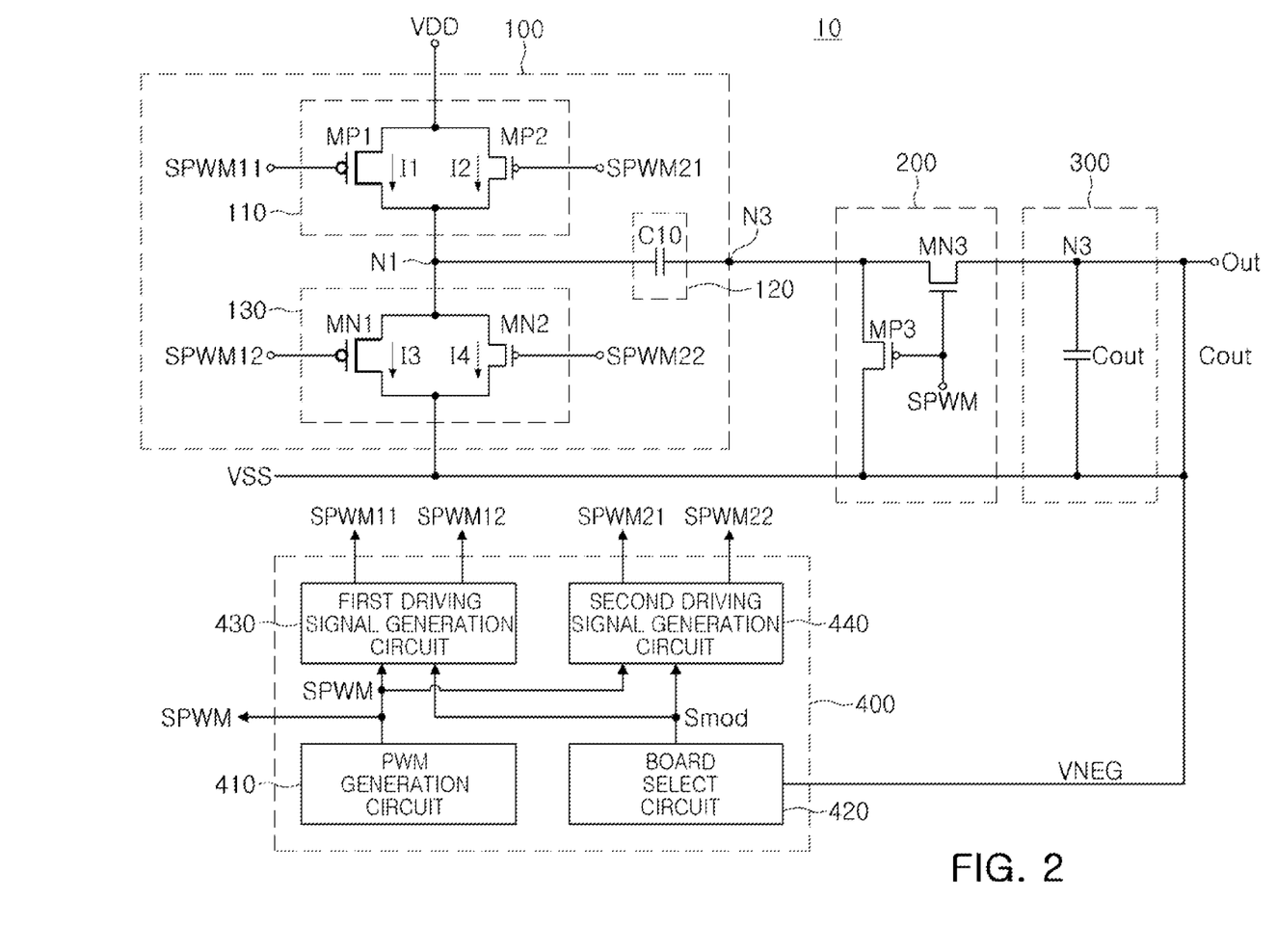
FIG. 2 illustrates an example of a negative voltage circuit.

FIGS. 1 and 2 illustrate examples of negative voltage circuits.

Referring to FIGS. 1 and 2, a negative voltage circuit 10 may include a dual charging circuit 110, a pumping capacitor circuit 120, a dual discharging circuit 130, an output switch circuit 200, and a load capacitor circuit 300.

The dual charging circuit 110 may be connected between a terminal of a first power supply voltage VDD and a middle node N1 to operate in a start-up mode or a normal operating mode during a charging mode, and may operate in the start-up mode or the normal operating mode in response to an operating mode control signal based on a negative voltage output from the negative voltage circuit 10. The dual charging circuit 110 may supply first and second charging currents I1 and I2, different from each other, depending on the start-up mode and the normal operating mode. As an example, the first current I1, loaded in the start-up mode, may be higher than the second current I2, loaded in the normal operating mode, to reduce operating time of the start-up mode.

The second pumping capacitor circuit 120 may be connected between the middle node N1 and a first capacitor node N2, and may perform charging based on the first and second currents I1 and I2 from the dual charging circuit 110.

The dual charging circuit 130 may be connected between the middle node N1 and a terminal of a second operating voltage VSS to operate in a discharging mode, and may operate in a start-up mode or a normal operating mode in response to the operating mode control signal. The dual charging circuit 130 may perform discharging of the pumping capacitor in such a manner that third and fourth currents I3 and I4, different from each other, flow between the pumping capacitor 120 and a ground based on the start-up mode and the normal operating mode. As an example, the third current I3, flowing to a ground in the start-up mode, may be higher than the fourth current I4, flowing to a ground in the normal operating mode, to reduce an operating time of the start-up mode.

The output switch circuit 200 may connect the first capacitor node N2 to one of a terminal of the second operating voltage VSS and an output terminal OUT of the negative voltage circuit 10.

The load capacitor circuit 300 may be connected between the output terminal OUT and a ground to stabilize a negative voltage VNEG at the output terminal OUT.

Referring to FIG. 2, the negative voltage circuit 10 may further include a control circuit 400. The control circuit 400 may control the start-up mode when an operation is started, control the normal operating mode following the start-up mode, and control the charging mode and the discharging mode in the start-up mode and the normal operating mode, respectively.

Referring to FIGS. 1 and 2, the dual charging circuit 110 may include a first charging switch MP1 and a second charging switch MP2.

The first charging switch MP1 may be connected between a terminal of the first power supply voltage VDD and the middle node N1 in response to a first driving signal SPWM11, and may enter an ON state for a charging operation in the start-up mode to supply a first current I1.

The second charging switch MP2 may be connected to the first charging switch MP1 in parallel in response to a third driving signal SPWM21, and may enter an ON state for a charging operation during the normal operating mode to supply a second current I2 less than the first current I1. As an example, the first charging switch MP1 may be larger than the second charging switch MP2.

The pumping capacitor circuit 120 may include a capacitor C10. The capacitor C10 may be connected between the middle node N1 and the first capacitor node N2.

The dual charging circuit 130 may include a first discharging switch MN1 and a second discharging switch MN2.

The first discharging circuit MN1 may be connected between the middle node N1 and a terminal of a second power supply voltage VSS in response to the third driving signal SPWM12, and may enter an ON state for a discharging operation during the start-up mode to supply a third current I3. As an example, the first charging switch MN1 may be larger than the second discharging switch MN2, and the second power supply voltage VSS may become a zero voltage.

The second discharging switch MN2 may be connected to the first discharging switch MN1 in parallel in response to a fourth driving signal SPWM22, and may enter an ON state for a discharging operation during the normal operating mode to supply a fourth current I4 less than the third current I3.

The output switch circuit 200 may include a ground switch MP3 and an output switch MN3.

The ground switch MP3 may be connected between the first capacitor node N2 and the terminal of the second operating voltage VSS to enter an ON state during the charging operation. The output switch MN3 may be connected between the first capacitor node N2 and the output terminal OUT to enter an ON state during the charging operation.

The load capacitor circuit 300 may include a load capacitor Cout. The load capacitor Cout may be connected between the output terminal OUT and a ground to stabilize a negative voltage VNEG at the output terminal OUT.

Referring to FIG. 2, the control circuit 400 may include a PWM generation circuit 410, a mode select circuit 420, a first driving signal generation circuit 430, and a second driving signal generation circuit 440.

The PWM generation circuit 410 may generate a PWM signal SPWM. For example, the PWM signal SPWM may be any one of a pulse signal in which a high level and a low level are repeated, a square wave signal, and an oscillating signal. Hereinafter, respective examples will be described based on a square wave signal for ease of description.

The mode select circuit 420 may control a start-up mode based on an output terminal VNEG when an operation is started and may generate an operating mode control signal Smod for controlling the normal operating mode following the start-up mode. As an example, the mode select circuit 420 may have a high level for selecting the start-up mode and a low level for selecting a normal operating mode, and vice versa.

The first driving signal generation circuit 430 may generate first and second driving signals SPWM11 and SPWM12 for controlling charging and discharging of the dual charging circuit 110 and the dual discharging circuit 130 based on the PWM signal SPWM and the operating mode control signal Smod during the start-up mode.

The second driving signal generation circuit 440 may generate third and fourth driving signals SPWM21 and SPWM22 for controlling charging and discharging of the dual charging circuit 110 and the dual discharging circuit 130 based on the PWM signal SPWM and the operating mode control signal Smod during the normal operation mode.

For example, the first and fourth driving signals SPWM11 and SPWM21 may have a high voltage level for charging and a low voltage level for discharging. The second and fourth driving signals SPWM12 and SPWM22 may have a low voltage level for discharging and a high voltage level for charging, and vice versa.

Referring to FIGS. 1 and 2, as an example, the first charging switch MP11, operating in the start-up mode, may have a size larger than a size of the second charging switch MP2 operating in the normal operating mode. The first discharging switch MN1, operating in the start-up mode, may have a size larger than a size of the second discharging switch MN2 operating in the normal operating mode.

For example, each of the first and second charging switches MP1 and MP2 and the ground switch MP3 may be a PMOS transistor, and each of the first and second discharging switches MN1 and MN2 and the output switch MN3 may be an NMOS transistor.

As another example, each of the output switch MN3 and the ground switch MP3 may include a diode rather than a MOS transistor.

In the respective drawings, duplicate descriptions of components having the same reference numeral and the same function will be omitted, and differences thereof will be described.

Figure 3:
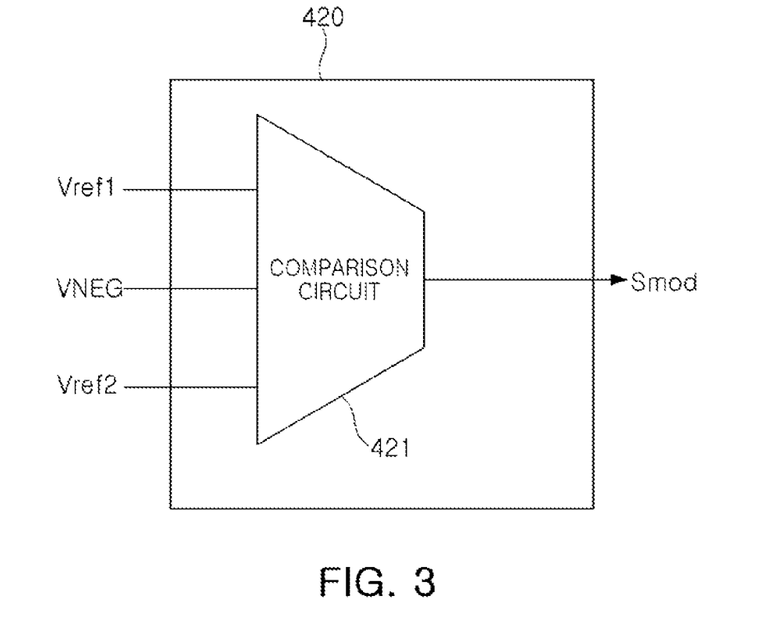
FIG. 3 illustrates an example of an operating mode control circuit.
Figure 4:
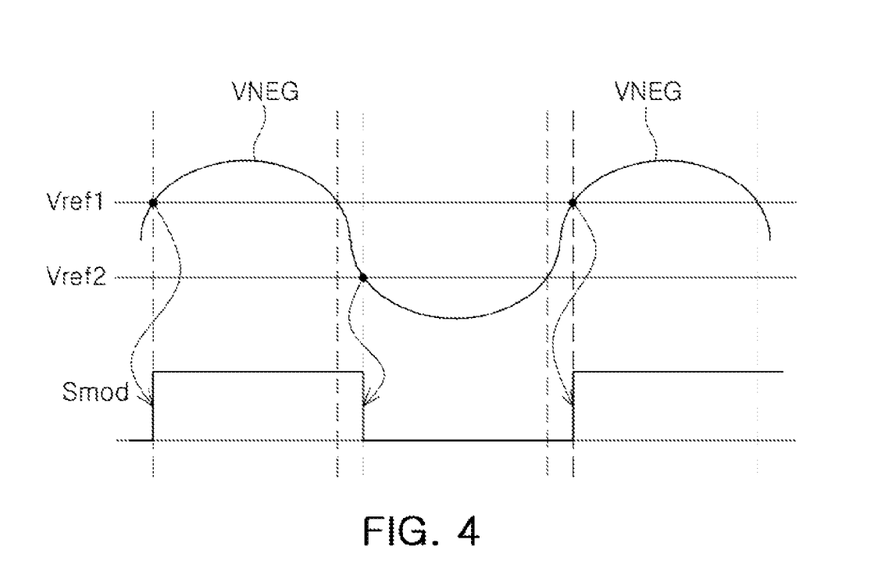
FIG. 4 is an example of a timing diagram of an operating mode control signal of an operating mode control circuit.

FIG. 3 illustrates an example of an operating mode control circuit, and FIG. 4 is an example of a timing diagram of an operating mode control signal of an operating mode control circuit.

Referring to FIGS. 3 and 4, the mode select circuit 420 may include a comparison circuit 421. The comparison circuit 421 may generate the operating mode control signal Smod transiting from a low level to a high level when the negative voltage VNEG is higher than or equal to the first reference voltage Vref1, and transitioning from a high level to a low level when the second reference voltage Vref2 is lower than or equal to the negative voltage VNEG.

As an example, a low-to-high transition of the operating mode control signal Smod is based on the first reference voltage Vref1, and a high-to-low transition of the operating mode control signal Smod is based on the second reference signal Vref2. Thus, the comparison circuit 251 may serve as a hysteresis comparator.

Figure 5:
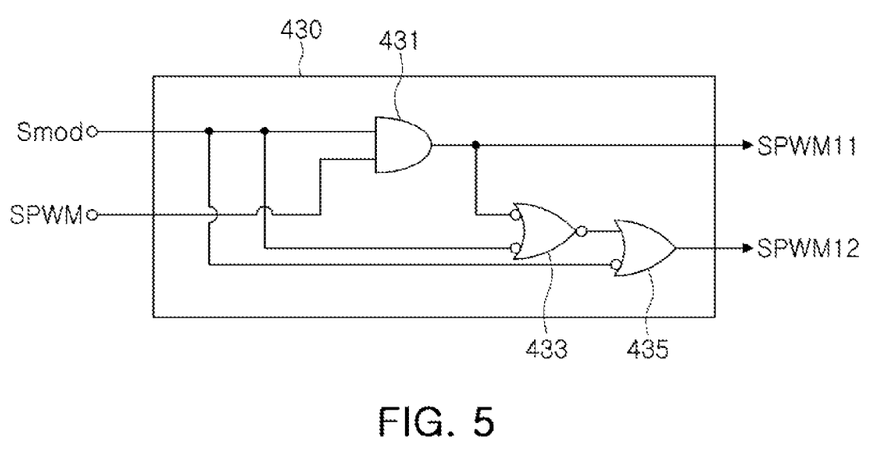
FIG. 5 illustrates an example of a first driving signal generation circuit.

FIG. 5 illustrates an example of a first driving signal generation circuit.

Referring to FIG. 5, the first driving signal generation circuit 430 may include a first logic determiner 431, a second logic determiner 433, and a third logic determiner 435, as an example.

The first logic determiner 431 may perform a logic AND operation on an operating mode control signal Smod and a PWM signal SPWM to generate a first driving signal SPWM11.

The second logic determiner 433 and the third logic determiner 435 may generate a first driving signal SPWM11. The second logic determiner 433 may perform a logic NOR operation on an inverted version of the first driving signal SPWM11 and an inverted version of the operating mode control signal Smod, and perform a logic OR operation on an output signal of the second logic determiner 433 and the inverted version of the operating mode control signal Smod to generate a second driving signal SPwM12.

The first driving signal generation circuit 430 described with reference to FIG. 5 is merely an example and is not limited thereto.

Figure 6:
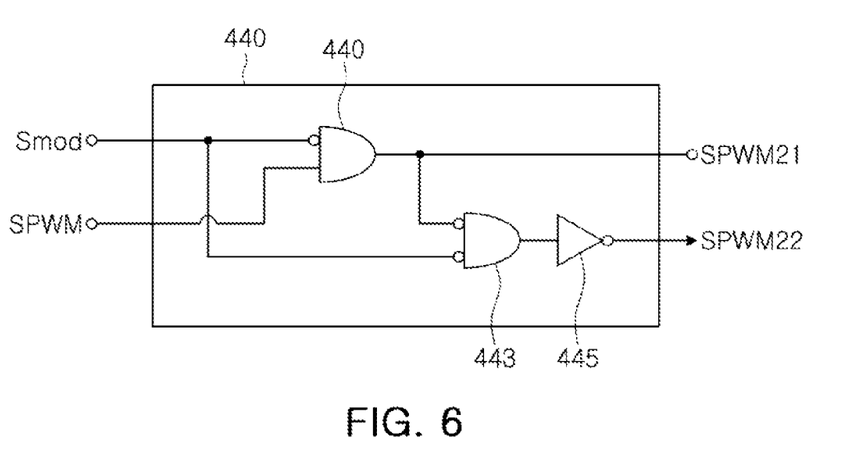
FIG. 6 illustrates an example of a second driving signal generation circuit.

FIG. 6 illustrates an example of a second driving signal generation circuit.

Referring to FIG. 6, the second driving signal generation circuit 440 may include a fourth logic determiner 441, a fifth logic determiner 443, and an inverter 445.

The fourth logic determiner 441 may perform a logic AND operation on the inverted version of the operating mode control signal Smod and the PWM signal SPWM to generate a third driving signal SPWM21.

The fifth logic determiner and the inverter 445 may generate a fourth driving signal SPWM22. The fifth logic determiner 443 may perform a logic AND operation on an inverted version of the third driving signal SPWM21 and the inverted version of the operating mode control signal Smod, and the inverter 445 may inverse an output signal of the fifth logic determiner 443 to generate the fourth driving signal SPWM22.

The second driving signal generation circuit 440 described with reference to FIG. 5 is merely an example and is not limited thereto.

Figure 7:
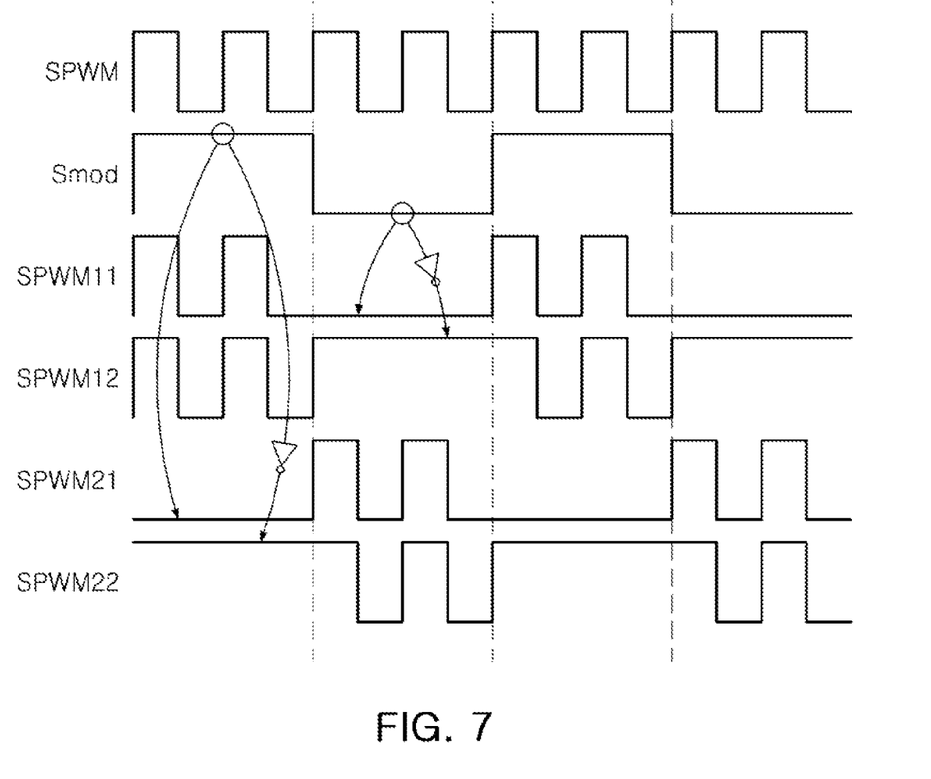
FIG. 7 is an example of an illustrative diagram of a start-up mode and a normal operating mode of an operating mode control circuit.

FIG. 7 is an example of an illustrative diagram of a start-up mode and a normal operating mode of an operating mode control circuit.

In FIG. 7, SPWM denotes a PWM signal generated by the PWM generation circuit 410, and Smod denotes an operating mode control signal generated by the mode select circuit 420. The operating mode single Smod may have a high level for controlling a start-up mode based on an output terminal VNEG when an operation is started and a low level for controlling a normal operating mode following the start-up mode.

SPWM11 denotes a first driving signal generated by the first driving signal generation circuit 430 and provided to a first charging switch MP1 of the dual charging circuit 110 to control a charging operation during the start-up mode and an OFF operation during the normal operating mode based on the PWM signal SPWM and the operating mode control signal Smod.

SPWM12 denotes a second driving signal generated by the first driving signal generation circuit 430 and provided to a first discharging switch MN1 of the dual discharging circuit 130 to control a discharging operation during the start-up mode and an OFF operation during the normal operating mode based on the PWM signal and the operating mode control signal Smod.

SPWM21 denotes a third driving signal generated by the second driving signal generation circuit 440 and provided to a second charging switch MP2 of the dual charging circuit 110 to control an OFF operation during the start-up mode and a charging operation during the normal operating mode based on the PWM signal SPWM and the operating mode control signal Smod.

SPWM22 is a third driving signal generated by the second driving signal generation circuit 440 and provided to a second discharging switch MN2 of the dual discharging circuit 130 to control an OFF operation during the start-up mode and a discharging operation during the normal operating mode based on the PWM signal SPWM and the operating mode control signal Smod.

As an example, the first driving signal generation circuit 430 may control operations of the first charging switch MP1 and the first discharging switch MN1 using the first and second driving signals SPWM11 and SPWM12.

The second driving signal generation circuit 440 may control operations of the second charging switch MP2 and the second discharging switch MN2 using the third and fourth driving signals SPWM21 and SPWM22.

Figure 8:
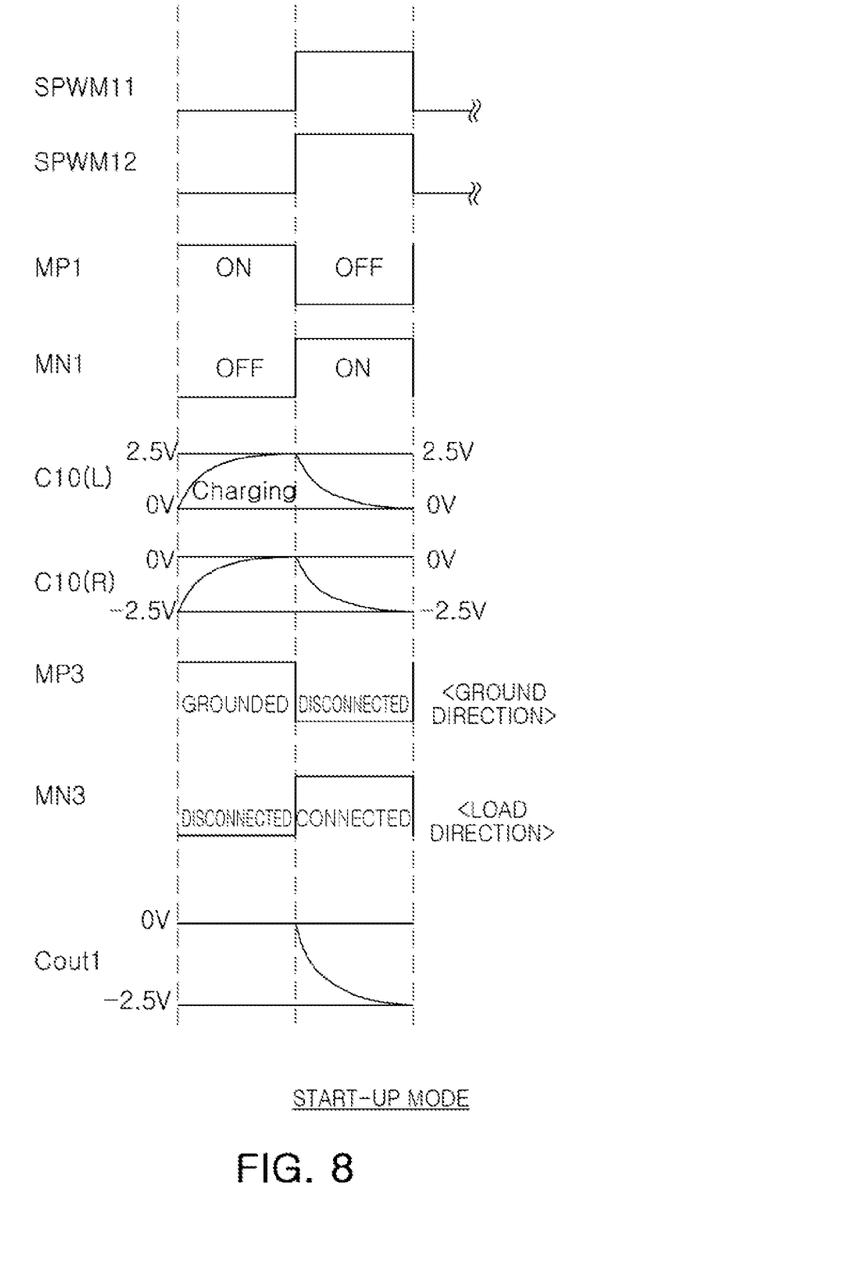
FIG. 8 is an example of a timing diagram of first and second driving signals and third and fourth driving signals for a start-up mode and a normal operating mode of an operating mode control circuit.
Figure 9:
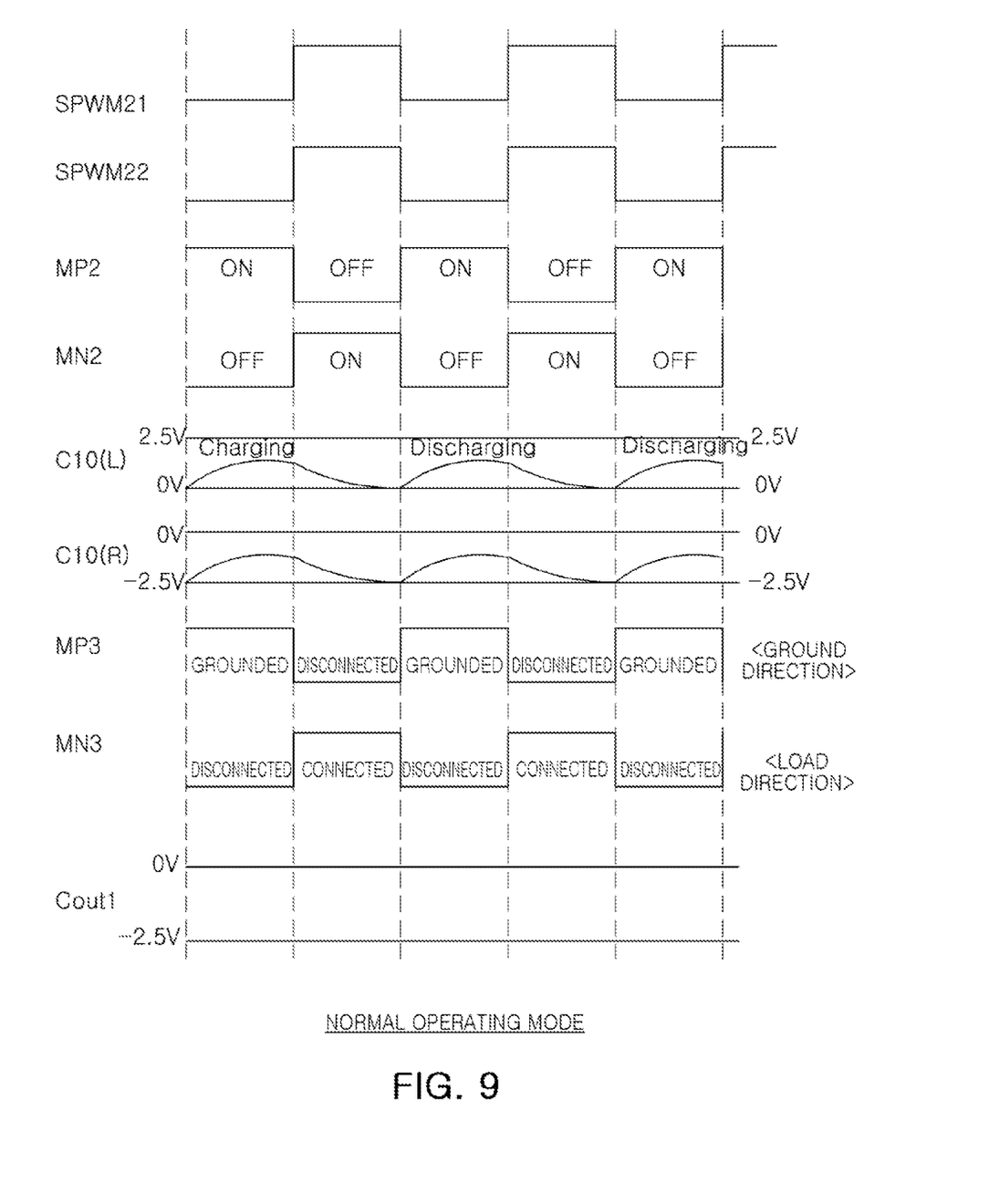
FIG. 9 is an example of an operational timing diagram of a negative voltage circuit for the normal operating mode of FIG. 7.

FIG. 8 is an example of a timing diagram of first and second driving signals and third and fourth driving signals for a start-up mode and a normal operating mode of an operating mode control circuit, and FIG. 9 is an example of an operational timing diagram of a negative voltage circuit for the normal operating mode of FIG. 7.

Hereinafter, the operation of the negative voltage circuit for the start-up mode will be described with reference to FIGS. 7 and 8.

As an example, the driving signal SPWM may be a square wave in which a high level and a low level are repeated.

As an example, a left voltage C10(L) of the first charge capacitor C10 (a voltage at a middle node Nm) may rise from zero volts (0 V) to 2.5 V during a charging operation and may fall from 1.5 V to 0 V during a discharging operation. As an example, charging from 0 V to +2.5 V may be performed for a short period of time by the first current I1, a relatively high current.

As an example, a right voltage C10(R) of the first charge capacitor C10 (a voltage at an output node No) may rise from −2.5 V to 0 V during a charging operation, and may fall from 0 V to −2.5 V during a discharging operation. As an example, discharging from +2.5 V to 0 V may be performed for a short period of time by a third current I3, a relatively high current.

Based on a PWM signal SPWM, the ground switch MP3 may enter an ON state (a grounded state) during the charging operation and may enter an OFF state (a disconnected state) during the discharging operation. Based on the PWM signal SPWM, the output switch MN3 may enter an OFF state (a disconnected state) during the charging operation and may enter an ON state (a connected state) during the discharging operation.

As a result, a voltage of the first load capacitor Cout1 may be rapidly switched from 0 V to a negative voltage of −2.5 V.

The operation of the negative voltage circuit for the normal operating mode with reference to FIG. 9 is the same as the description of the operation with reference to FIG. 8, except for a difference below.

A difference between FIG. 8 and FIG. 9 will now be described. A rising speed or charge rate of each of the left voltage C10(L) and the right voltage C10(R) of the first charge capacitor C10 in a start-up mode is higher (for example, twice higher) than a rising speed or charge rate of each of the left voltage C20(L) and the right voltage C20(R) of the second charging capacitor C20 in a normal operating mode.

In addition, a falling speed or discharge rate of each of the left voltage C10(L) and the right voltage C10(R) of the first charge capacitor C10 in the start-up mode is higher (for example, twice higher) than a falling speed or discharge rate of each of the left voltage C20(L) and the right voltage C20(R) of the second charging capacitor C20 in the normal operating mode.

Accordingly, a voltage at an output terminal may reach a negative voltage more rapidly in the start-up mode, and then the normal operating mode may be performed to allow the negative voltage to be maintained.

Figure 10:
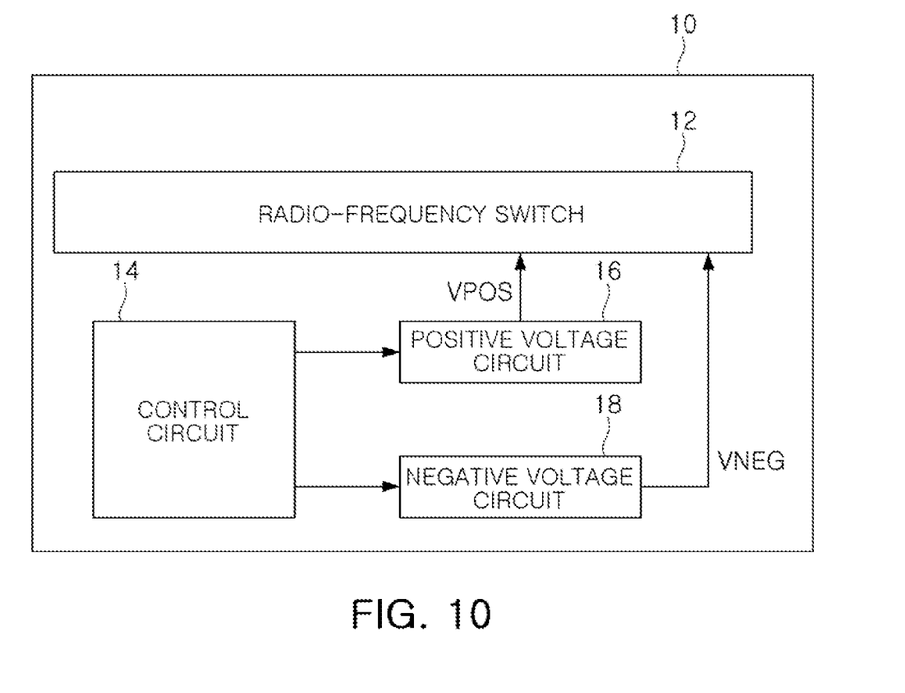
FIG. 10 is an example of an illustrative diagram of an application of a negative voltage circuit according to an example.

FIG. 10 is an example of an illustrative diagram of the application of a negative voltage circuit.

Referring to FIG. 10, a negative voltage 200 may be applied to a radio-frequency switch device 10, in a non-limiting example.

The radio-frequency switch device 10 may include a radio-frequency circuit 12 configured to switch a radio-frequency signal, a control circuit 14 configured to control supply of a positive voltage VPOS and a negative voltage VNEG, a positive voltage circuit 16 configured to generate the positive voltage VPOS, and a negative voltage circuit 18 according to the present disclosure.

FIG. 10 merely illustrates an example to which the negative voltage circuit 18 is applied, but is not limited thereto.

A control circuit of a negative voltage circuit according to an example may be implemented in a computing environment in which a processor (for example, a central processing unit (CPU), a graphics processing unit (GPU), a microprocessor, an application specific integrated circuit (ASIC), field programmable gate arrays (FPGA), or the like), a memory (for example, a RAM, or the like), a nonvolatile memory (for example, a ROM, flash memory, or the like) are interconnected (for example, a peripheral component interconnect (PCI), a universal serial bus (USB), firmware (IEEE 1394), an optical bus structure, a network, or the like).

The computing environment may be implemented using a personal computer, a server computer, a handheld or laptop device, a mobile device (for example, a mobile phone, a personal digital assistant (PDA), media player, or the like), a multiprocessor system, a consumer electronic device, a minicomputer, a mainframe computer, any of the above systems, or a distributed computing environment including a device, but is not limited thereto.

As described above, according to an example, a relatively high current may be supplied in an initial start-up mode, and a relatively lower current may be supplied in a normal operating mode than in the start-up mode by using a single dual charge pump. Thus, a rapid start-up may be implemented, and power consumption may be reduced in the normal operating mode. As a result, the time of the start-up mode may be reduced to reach the normal operating mode more rapidly.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A negative voltage circuit, comprising:
   a dual charging circuit, connected between a terminal of a first power supply voltage and a middle node, configured to
      operate in a start-up mode or a normal operating mode during a charging mode, and
      supply a first current in the start-up mode higher than a second current in the normal operating mode;
   a pumping capacitor circuit, connected between the middle node and a first capacitor node, configured to charge based on a charging current from the dual charging circuit;
   a dual discharging circuit, connected between the middle node and a terminal of a second operating mode, configured to
      operate in the start-up mode or the normal operating mode during a discharging mode, and
      discharge the pumping capacitor to allow a third current in the start-up mode to flow between the pumping capacitor and the terminal of the second operating voltage, wherein the third current in the start-up mode is higher than a fourth current in the normal operating mode;
   an output switch circuit connecting the first capacitor node to one of a terminal of the second operating voltage and an output terminal of a negative voltage circuit; and
   a load capacitor circuit connected between the output terminal and a ground to stabilize a negative voltage at the output terminal.

2. The negative voltage circuit of claim 1, wherein the dual charging circuit comprises:
   a first charging switch, connected between the terminal of the first power supply voltage and the middle node, configured to be in an ON state in a charging operation during the start-up mode to supply the first current; and
   a second charging switch, connected to the first charging switch in parallel, configured to be in an ON state in a charging operation during the normal operating mode to supply the second current less than the first current.

3. The negative voltage circuit of claim 2, wherein the pumping capacitor circuit comprises a capacitor connected between the middle node and the first capacitor node.

4. The negative voltage circuit of claim 3, wherein the dual discharging circuit comprises a first discharging switch, connected between the middle node and a terminal of a second power supply voltage, configured to be in an ON state in a discharging operation during the normal operating mode to supply the fourth current less than the third current.

5. The negative voltage circuit of claim 4, wherein the output switch circuit comprises:
   a ground switch, connected to the first capacitor node and the terminal of the second operating voltage, and configured to be in an ON state during the charging operation; and
   an output switch, connected between the first capacitor node and the output terminal, and configured to be in ON state during the discharging operation.

6. The negative voltage circuit of claim 5, wherein the load capacitor circuit is connected between the output terminal and a ground to stabilize the negative voltage at the output terminal.

7. A negative voltage circuit, comprising:
   a dual charging circuit, connected between a terminal of a first power supply voltage and a middle node, configured to
      operate in a start-up mode or a normal operating mode during a charging mode, and
      supply a first current in the start-up mode higher than a second current in the normal operating mode;
   a pumping capacitor circuit, connected between the middle node and a first capacitor node, configured to charge based on a charging current from the dual charging circuit;
   a dual discharging circuit, connected between the middle node and a terminal of a second operating mode, configured to
      operate in the start-up mode or the normal operating mode during a discharging mode, and
      discharge the pumping capacitor to allow a third current in the start-up mode to flow between the pumping capacitor and the terminal of the second operating voltage, wherein the third current in the start-up mode is higher than a fourth current in the normal operating mode;
   an output switch circuit connecting the first capacitor node to one of a terminal of the second operating voltage and an output terminal of a negative voltage circuit;
   a load capacitor circuit connected between the output terminal and a ground to stabilize a negative voltage at the output terminal; and
   a control circuit configured to control the start-up mode upon an operation being started, the normal operating mode subsequent to the start-up mode, and the charging mode and the discharging mode in the start-up mode and the normal operating mode, respectively.

8. The negative voltage circuit of claim 7, wherein the control circuit comprises:
   a PWM generation circuit configured to generate a PWM signal;
   a mode select circuit configured to control the start-up mode based on the negative voltage upon the operation being started and generate the operating mode control signal for controlling the normal operation mode subsequent to the start-up mode;

a first driving signal generation circuit configured to generate first and second driving signals for controlling a charging of the dual charging circuit and a discharging of the dual discharging circuit based on the PWM signal and the operating mode control signal during the start-up mode; and a second driving signal generation circuit configured to generate third and fourth driving signals for controlling a charging of the dual charging circuit and a discharging of the dual discharging circuit based on the PWM signal and the operation mode control signal during the normal operating mode.

9. The negative voltage circuit of claim 8, wherein the mode select circuit comprises:

a comparison circuit configured to
   transition from a low level to a high level upon the negative voltage being higher than or equal to a first reference voltage, and
   transition from a high level to a low level upon the negative voltage being less than or equal to the second reference voltage.

10. The negative voltage circuit of claim 9, wherein the dual charging circuit comprises:

a first charging switch, connected between the terminal of the first power supply voltage and the middle node, configured to be in an ON state in a charging operation during the start-up mode to supply the first current; and a second charging switch, connected to the first charging switch in parallel, configured to be in an ON state in a charging operation during the normal operating mode to supply a second current less than the second current.

11. The negative voltage circuit of claim 10, wherein the pump capacitor circuit comprises a capacitor connected between the middle node and the first capacitor node.

12. The negative voltage circuit of claim 11, wherein the dual discharging circuit comprises:

a first discharging switch, connected between the middle node and a terminal of a second power supply voltage, configured to be in an ON state in a discharging operation during the start-up mode to supply the third current; and a second discharging circuit, connected to the first discharging switch in parallel, configured to be in an ON state in a discharging operation during the normal operating mode to supply the fourth current less than the third current.

13. The negative voltage circuit of claim 12, wherein the first driving signal generation circuit controls operations of the first charging switch and the first discharging switch using the first and second driving signals, respectively.

14. The negative voltage circuit of claim 13, wherein the second driving signal generation circuit controls operations of the second charging switch and the second discharging switch using the third and fourth driving signals, respectively.

15. The negative voltage circuit of claim 13, wherein the output switch circuit comprises:

a ground switch, connected between the first capacitor node and the terminal of the second operating voltage, configured to be in an ON state during the charging operation; and an output switch, connected between the first capacitor node and the output terminal, configured to be in an ON state during the discharging operation.

16. The negative voltage circuit of claim 15, wherein the load capacitor circuit comprises a load capacitor connected between the output terminal and a ground to stabilize the negative voltage at the output terminal.

* * * * *